US012748180B2

(12) United States Patent
Li et al.

(10) Patent No.: US 12,748,180 B2
(45) Date of Patent: Sep. 29, 2026

(54) WAVEFORM DESIGN METHOD, INTEGRATED COMMUNICATION, SENSING AND COMPUTATION SYSTEM, AND RELATED DEVICE

(71) Applicant: Shenzhen Research Institute of Big Data, Shenzhen (CN)

(72) Inventors: Xiaoyang Li, Shenzhen (CN); Guangxu Zhu, Shenzhen (CN); Hang Li, Shenzhen (CN); Qingjiang Shi, Shenzhen (CN)

(73) Assignee: Shenzhen Research Institute of Big Data, Shenzhen (CN)

( * ) Notice: Subject to any disclaimer, the term of this patent is extended or adjusted under 35 U.S.C. 154(b) by 276 days.

(21) Appl. No.: 18/581,969

(22) Filed: Feb. 20, 2024

(65) Prior Publication Data

US 2025/0004098 A1 Jan. 2, 2025

(30) Foreign Application Priority Data

Jun. 30, 2023 (CN) ......................... 202310788182.2

(51) Int. Cl.

| | |
|---|---|
| ***G01S 7/282*** | (2006.01) |
| ***G01S 7/00*** | (2006.01) |
| ***G01S 13/42*** | (2006.01) |
| ***H04W 28/02*** | (2009.01) |

(52) U.S. Cl.

CPC .............. *G01S 7/282* (2013.01); *G01S 7/006* (2013.01); *G01S 13/428* (2013.01); *H04W 28/0205* (2013.01)

(58) Field of Classification Search

CPC ........ G01S 7/282; G01S 7/006; G01S 13/428; H04W 28/0205

See application file for complete search history.

(56) References Cited

U.S. PATENT DOCUMENTS

| | | | | |
|---|---|---|---|---|
| 2013/0083942 A1* | 4/2013 | Hgren | H04R 3/005 | 381/92 |
| 2016/0013850 A1* | 1/2016 | Zhou | H04B 7/0413 | 375/267 |
| 2022/0021426 A1* | 1/2022 | Piirainen | H04B 7/024 | |
| 2023/0033028 A1* | 2/2023 | Wang | H04B 7/0617 | |
| 2025/0337462 A1* | 10/2025 | Lee | H04B 7/0634 | |

* cited by examiner

*Primary Examiner* — Nazra Nur Waheed

(74) *Attorney, Agent, or Firm* — M&B IP Analysts, LLC

(57) ABSTRACT

A waveform design method, an integrated communication, sensing and computation system, and a related device are disclosed. The waveform design method includes: constructing a first constraint condition related to a receiving beamformer and two restrictive conditions related to a transmitting beamformer; constructing a first optimization condition set and a second optimization condition set according to the first constraint condition and the different restrictive conditions; solving the first optimization condition set and the second optimization condition set respectively in different operating modes, so that optimization values for the receiving beamformer and the transmitting beamformer in the different operating modes can be obtained, and a transmitted waveform can be designed according to the optimization values.

10 Claims, 9 Drawing Sheets

WAVEFORM DESIGN METHOD, INTEGRATED COMMUNICATION, SENSING AND COMPUTATION SYSTEM, AND RELATED DEVICE

CROSS-REFERENCE TO RELATED APPLICATION

This application is filed on the basis of Chinese patent application No. 2023107881822 filed Jun. 30, 2023, and claims priority of the Chinese patent application, the entire contents of which are incorporated herein by reference.

TECHNICAL FIELD

The present disclosure relates to the technical field of communication, and in particular to a waveform design method, an integrated communication, sensing and computation system, and a related device.

BACKGROUND

With the development of the Internet of Things, massive data need to be collected by sensing devices from the environment and transmitted to a server for subsequent processing. In conventional data processing, data sensing, transmission and computation are designed separately. This mechanism will lead to the competition between sensing and communication signals for spectrum resource, increasing the burden of wireless channels and causing more congestion of communication links.

In the related work, in order to improve the spectral efficiency, a transmitted signal for radar communication and sensing is designed, and the integrated sensing and communication technology is used to realize simultaneous data sensing and transmission at the physical layer. Meanwhile, over-the-air computation has been proposed for fast function computation by exploiting the waveform-addition property during signal transmission. However, the sensing, communication, and computation functionalities have not been considered together, resulting the low resource utilization efficiency.

SUMMARY

A main objective of embodiments of the present disclosure is to propose a waveform design method, an integrated communication, sensing and computation system, and a related device, so as to improve the data processing performance evaluated by the data processing accuracy by optimizing the signal waveform.

In order to achieve the above objective, in a first aspect, an embodiment of the present disclosure proposes a waveform design method, applied to an integrated communication, sensing and computation system, wherein the integrated communication, sensing and computation system includes a transmitting beamformer, a receiving beamformer, and multiple sensing devices, wherein a transmitted signal of the sensing device is obtained by performing beamforming on an initial transmitted signal by the transmitting beamformer, and the method includes:

acquiring a received vector aggregated by the receiving beamformer, calculating a result standard deviation between the received vector and a true data value, and minimizing the result standard deviation to construct a first constraint condition;

calculating a covariance matrix of the transmitted signal according to the transmitting beamformer, and obtaining a first restrictive condition and a second restrictive condition based on the covariance matrix;

if the integrated communication, sensing and computation system operates in a first mode, constructing a first optimization condition set according to the first constraint condition and the first restrictive condition, and solving the first optimization condition set in a first alternating optimization process to obtain a first beamforming weight optimization value for the receiving beamformer and a second beamforming weight optimization value for the transmitting beamformer;

if the integrated communication, sensing and computation system operates in a second mode, constructing a second optimization condition set according to the first constraint condition and the second restrictive condition, and solving the second optimization condition set to obtain a third beamforming weight optimization value for the receiving beamformer and a fourth beamforming weight optimization value for the transmitting beamformer; and generating a transmitted waveform for the transmitted signal by using the second beamforming weight optimization value for the transmitting beamformer in the first mode, or generating a transmitted waveform for the transmitted signal by using the fourth beamforming weight optimization value for the transmitting beamformer in the second mode.

In an embodiment, the steps of acquiring a received vector aggregated by the receiving beamformer, calculating a result standard deviation between the received vector and a true data value, and minimizing the result standard deviation to construct a first constraint condition includes:

calculating the true data value according to the initial transmitted signal of each of the sensing devices;

obtaining the received vector based on a channel matrix of the sensing device, the transmitted signal, and the receiving beamformer; and calculating a standard deviation between the received vector and the true data value to obtain the result standard deviation, and performing minimizing constraint on the result standard deviation to obtain the first constraint condition.

In an embodiment, the first mode is an omnidirectional mode, and the first alternating optimization process includes a plurality of first iteration processes; and the steps of constructing a first optimization condition set according to the first constraint condition and the first restrictive condition, solving the first optimization condition set in a first alternating optimization process to obtain a first beamforming weight optimization value for the receiving beamformer and a second beamforming weight optimization value for the transmitting beamformer includes:

sequentially executing the first iteration processes, wherein the first iteration processes include the following steps:

when a first weight value of the first beamforming weight optimization value is given, obtaining the second weight value by using the first restrictive condition;

obtaining the first weight value of the next one of the first iteration processes based on the second weight value by using the first constraint condition; and repeating the above steps until all the first iteration processes are executed; and obtaining the first beamforming weight optimization value according to the first weight value of each of the first iteration processes, and obtaining the second beamforming weight optimization value according to the second weight value of each of the first iteration processes.

In an embodiment, the second mode is a directional mode, and the steps of constructing a second optimization condition set according to the first constraint condition and the second restrictive condition, solving the second optimization condition set to obtain a third beamforming weight optimization value for the receiving beamformer and a fourth beamforming weight optimization value for the transmitting beamformer includes:

decomposing the covariance matrix by using a Cholesky decomposition method, so that the second restrictive condition is transformed into a third restrictive condition;

transforming the first constraint condition into a second constraint condition based on the third restrictive condition;

constructing a third optimization condition set according to the second constraint condition and the third restrictive condition; and solving the third optimization condition set to obtain the third beamforming weight optimization value for the receiving beamformer and the fourth beamforming weight optimization value for the transmitting beamformer.

In an embodiment, the step of solving the third optimization condition set to obtain the third beamforming weight optimization value for the receiving beamformer and the fourth beamforming weight optimization value for the transmitting beamformer includes:

when a fourth weight value of the fourth beamforming weight optimization value is given, transforming the second constraint condition into a third constraint condition based on the fourth weight value and a matching weight factor;

obtaining a fourth restrictive condition according to the third restrictive condition;

constructing a fourth optimization condition set according to the third constraint condition and the fourth restrictive condition; and solving the fourth optimization condition set to obtain the third beamforming weight optimization value for the receiving beamformer and the fourth beamforming weight optimization value for the transmitting beamformer.

In an embodiment, the steps of solving the fourth optimization condition set, and updating the fourth weight value of the fourth beamforming weight optimization value includes:

transforming the third constraint condition into a fourth constraint condition based on a Frobenius norm;

obtaining a fifth optimization condition set according to the fourth constraint condition and the fourth restrictive condition, and solving the fifth optimization condition set in a second alternating optimization process, wherein the second alternating optimization process comprises a plurality of second iteration processes, which include following steps:

when a third weight value of the third beamforming weight optimization value is given, transforming the fourth constraint condition into a fifth constraint condition;

constructing a sixth optimization condition set based on the fifth constraint condition and the fourth restrictive condition;

solving the sixth optimization condition set to obtain the fourth weight value of a next one of the second iteration processes;

obtaining the third weight value of the next one of the second iteration processes based on the fourth weight value; and repeating the above steps until all the second iteration processes are executed; and obtaining the third beamforming weight optimization value according to the third weight value of each of the second iteration processes, and obtaining the fourth beamforming weight optimization value according to the fourth weight value of each of the second iteration processes.

In order to achieve the above objective, in a second aspect, an embodiment of the present disclosure proposes a waveform design device, applied to an integrated communication, sensing and computation system, wherein the integrated communication, sensing and computation system includes a transmitting beamformer, a receiving beamformer, and multiple sensing devices, wherein a transmitted signal of the sensing device is obtained by performing beamforming on an initial transmitted signal by the transmitting beamformer, and the waveform design device includes:

a first constraint condition construction module, configured to acquire a received vector aggregated by the receiving beamformer, calculate a result standard deviation between the received vector and a true data value, and minimize the result standard deviation to construct a first constraint condition;

a first restrictive condition construction module, configured to calculate a covariance matrix of the transmitted signal according to the transmitting beamformer, and obtain a first restrictive condition and a second restrictive condition based on the covariance matrix and total transmission power;

a first mode solving module, configured to, if the integrated communication, sensing and computation system operates in a first mode, construct a first optimization condition set according to the first constraint condition and the first restrictive condition, and solve the first optimization condition set in a first alternating optimization process to obtain a first beamforming weight optimization value for the receiving beamformer and a second beamforming weight optimization value for the transmitting beamformer;

a second mode solving module, configured to, if the integrated communication, sensing and computation system operates in a second mode, construct a second optimization condition set according to the first constraint condition and the second restrictive condition, and solve the second optimization condition set to obtain a third beamforming weight optimization value for the receiving beamformer and a fourth beamforming weight optimization value for the transmitting beamformer; and a waveform design module, configured to generate a transmitted waveform for the transmitted signal by using the first beamforming weight optimization value for the receiving beamformer and the second beamforming weight optimization value for the transmitting beamformer in the first mode, or generate a transmitted waveform for the transmitted signal by using the third beamforming weight optimization value for the receiving beamformer and the fourth beamforming weight optimization value for the transmitting beamformer in the second mode.

In order to achieve the above objective, in a third aspect, an embodiment of the present disclosure proposes an integrated communication, sensing and computation system, including a transmitting beamformer and a receiving beamformer, wherein a first beamforming weight optimization value for the receiving beamformer and a second beamforming weight optimization value for the transmitting beamformer are calculated according to the waveform design method of any one of the embodiments in the first aspect.

In order to achieve the above objective, in a fourth aspect, an embodiment of the present disclosure proposes an electronic device, including a memory and a processor, wherein the memory stores a computer program which, when executed by the processor, implements the method in the first aspect.

In order to achieve the above objective, in a fifth aspect, an embodiment of the present disclosure proposes a storage medium, which is a non-transitory computer-readable storage medium, wherein the storage medium stores a computer program which, when executed by a processor, causes the processor to implement the method in the first aspect.

According to the waveform design method, the integrated communication, sensing and computation system and the related device proposed by the embodiments of the present disclosure, a first constraint condition related to a receiving beamformer and two restrictive conditions related to a transmitting beamformer are constructed, a first optimization condition set and a second optimization condition set are constructed according to the first constraint condition and the different restrictive conditions, and the first optimization condition set and the second optimization condition set are solved respectively in different operating modes, so that optimization values for the receiving beamformer and the transmitting beamformer in the different operating modes are obtained. According to the embodiments of the present disclosure, the beamforming of the transmitter and the beamforming of the receiver are designed to simultaneously adjust the antennas of the transmitter and the receiver. Consequently, on the premise of ensuring sensing accuracy, the error of over-the-air computation is minimized, the performance of over-the-air computation and the efficiency of data processing are increased, and therefore, the efficiency of resource utilization is increased.

DETAILED DESCRIPTION

Figure 1:
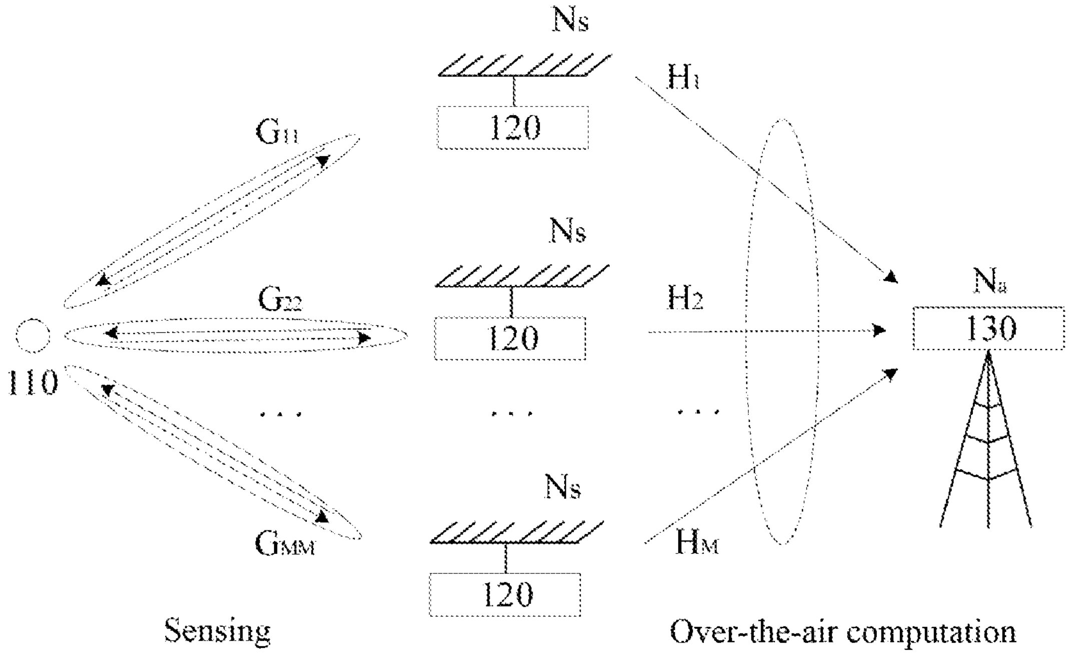
FIG. 1 is a schematic diagram of an integrated communication, sensing and computation system according to an embodiment of the present disclosure.

In order to make the objectives, technical solutions and advantages of the present disclosure clearer, the present disclosure will be further described in detail below in reference to drawings and embodiments. It should be understood that the specific embodiments described herein are only used to explain the present disclosure rather than to limit the present disclosure.

It should be noted that although the division of functional modules is shown in a schematic diagram of an apparatus and a logical order is shown in a flowchart, in some cases, the steps shown or described may be performed in an order different from the division of the modules in the apparatus or in the flowchart.

Unless otherwise defined, all technical and scientific terms used herein have the same meaning as those commonly understood by those having ordinary skill in the art. The terms used herein are only for the purpose of describing the embodiments of the present disclosure, and are not intended to limit the present disclosure.

Firstly, some terms involved in the present disclosure are explained:

Beamforming is a signal processing technology, which increases the quality of signal transmission by adjusting the direction of signal transmission (or reception). Beamforming can reduce interference in transmission and increase the coverage and reliability of signals. In a communication system, beamforming is applied to control the direction and shape of transmitted signals in a certain way, so that the signals can be transmitted to a target location more concentratively, thus increasing the quality of communication. Unlike conventional omnidirectional transmission or reception, beamforming can concentrate signal energy to an area required to be covered, reducing the transmission of signals in areas not required to be covered, and therefore, efficiency and capacity can be improved. Beamforming has been widely used in new-generation wireless communication technologies such as 5G and millimeter wave communication. In addition to communication systems, beamforming can also be used in radar, sonar, medical imaging and other fields, which can increase the detection range and accuracy of signals.

With the development of the Internet of Things, massive data need to be collected by sensing devices from the environment and transmitted to a server for subsequent processing. In data processing, data sensing, transmission and computation are designed separately. This mechanism will lead to the competition between data sensing and transmission for spectrum resource and the competition between data sensing, transmission, and computation for time resource.

In order to realize simultaneous communication and sensing, a target reflected signal is projected into a transmission space orthogonal to a communication signal. In order to further increase the efficiency of communication and sensing, a multi-antenna system has been developed to realize multiple-input multiple-output radar sensing and communication. This system integrated with radar sensing and communication requires the transmitter and the receiver to feedback states in real time, which causes serious information interaction burden. Therefore, in order to increase the spectral efficiency, the integrated sensing and communication technology is utilized to realize simultaneous data sensing and transmission at the physical layer, i.e., to design a dual-function signal which can be used for both target sensing and data transmission.

Since computation is often at the network layer or the application layer, it is difficult to combine it with the integrated sensing and communication technology in the physical layer. The emergence of over-the-air computation makes data computation at the physical layer possible. By utilizing the superposition property of analog signals in the process of multiple access channel propagation, the over-the-air computation technology can realize function computation in the process of signal propagation. Unlike conventional multiple access solutions, over-the-air computation is intended to reduce the errors between collected statistical information and true values. Based on over-the-air computation, the integrated sensing, communication and computation technology can be realized at the air interface of the physical layer. The over-the-air computation performance of the integrated communication, sensing and computation system is limited by the parameter design of beamformers. However, the designed performance of the beamformers in the related work does not take computation into consideration, and the efficiency of resource utilization is low, leading to poor performance.

Based on this, the embodiments of the present disclosure provide a waveform design method, an integrated communication, sensing and computation system, and a related device. The beamforming of the transmitter and the beamforming of the receiver are designed to simultaneously adjust the antennas of the transmitter and the receiver. Consequently, on the premise of ensuring sensing accuracy, the error of over-the-air computation is minimized, the performance of over-the-air computation and the efficiency of data processing are increased, and therefore, the efficiency of resource utilization is increased.

The waveform design method and the integrated communication, sensing and computation system according to the embodiments of the present disclosure will be described in detail by the following embodiments. The antenna waveform design method in the embodiment of the present disclosure will be described first.

The integrated communication, sensing and computation system in the embodiment of the present disclosure will be described first.

Referring to FIG. 1, the integrated communication, sensing and computation system includes a sensed target 110, M sensing devices 120 with Ns antennas, the M sensing devices 120 forming a device cluster $\mathcal{M}$, and a server 130 for receiving the over-the-air computation results, the server 130 is equipped with Na antennas. In an embodiment, the Ns antennas of each of the sensing devices 120 are used to sense a target, and send multiple classes of sensed data to the server 130, the data undergo waveform superposition in the process of signal transmission to realize over-the-air computation, and finally, the server 130 demodulates out a required computation result. In an embodiment, the server 130 may be a wireless router with data processing functionality.

The whole signal transceiving time is divided into T time periods. In each time period, each sensing device 120 transmits a signal, and each transmitted signal not only carries data to the server via over-the-air computation, but also serves as a radar sensing pulse for target 110 detection. The transmitted signals enable simultaneous sensing, communication and computation. Target reflected signals which are obtained after the transmitted signals are reflected by the sensed target 110 are received by corresponding sensing devices 120, and the transmitted signals are received by the server 130 after over-the-air computation.

In an embodiment, among the $N_s$ antennas of each sensing device 120, $N_t$ antennas are used for the transmission of the transmitted signals, $N_r$ antennas are used for the reception of the target reflected signals, where $N_t+N_r=N_s$. The transmitted signals of each device obey an independent and identical distribution with a mean of 0 and a variance of 1.

In an embodiment, in the $l^{th}$ time period, the initial transmitted signal sent by the $m^{th}$ sensing device 120 may be expressed as a $N_t$-dimensional vector $s_m$. For a sensing device 120, the initial transmitted signal $s_m$ needs to meet an independent and identical distribution with a mean of 0 and a variance of 1, i.e., $$\mathbb{E}_t\left[s_m[t]s_m^H[t]\right] = I.$$

In addition, the initial transmitted signals of all sensing devices 120 with i≠m need to meet a condition:

$$\mathbb{E}_t\left[s_m[t]s_i^H[t]\right] = 0.$$

In an embodiment, the integrated communication, sensing and computation system 10 further includes beamformers. The beamformers are devices which use an antenna array to carry out beamforming, related to a signal processing technology for directional transmission or reception. The beamformers in this embodiment include a transmitting beamformer and a receiving beamformer. The transmitting beamformer is configured to perform beamforming on the transmitted signals. It should be understood that the beamformers may be in the form of matrixes. In the embodiment of the present disclosure, beamforming serves to increase the signal-to-noise ratio of received signals, eliminate undesirable interference and concentrate the transmitted signals to a specific direction.

The waveform design method in the embodiment of the present disclosure will be described below.

Figure 2:
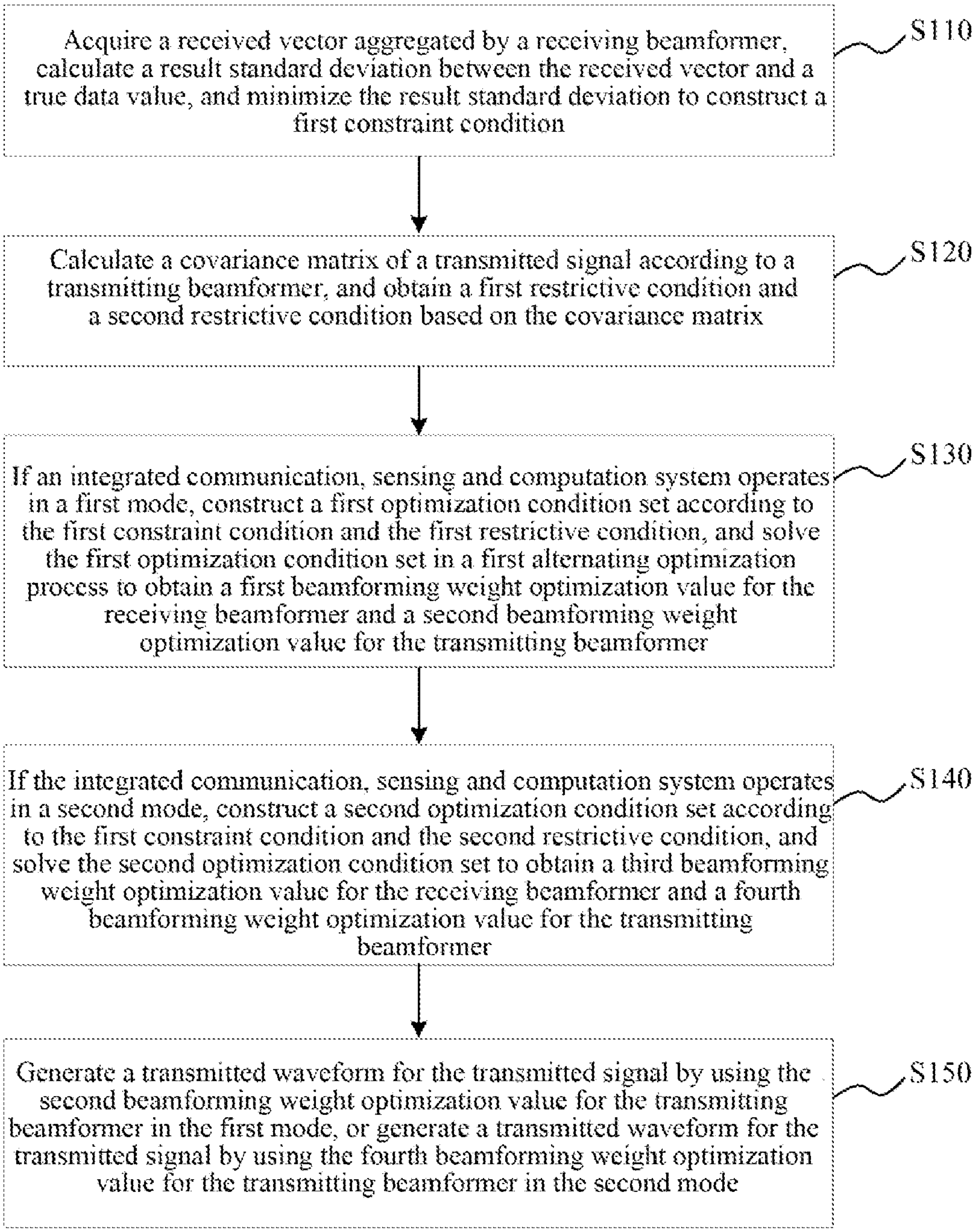
FIG. 2 is a flowchart of a waveform design method according to another embodiment of the present disclosure.

FIG. 2 is an optional flowchart of a waveform design method according to an embodiment of the present disclosure, and the method in FIG. 2 may include, but is not limited to, steps S110 to S150. Moreover, it should be understood that the order of steps S110 to S150 in FIG. 2 is not specifically limited in this embodiment, and the order of the steps may be adjusted or some steps may be omitted or added according to actual requirements.

At step S110, a received vector aggregated after the receiving beamforming is acquired, a result standard deviation between the received vector and a true data value is calculated, and the result standard deviation is minimized to construct a first constraint condition.

Figure 3:
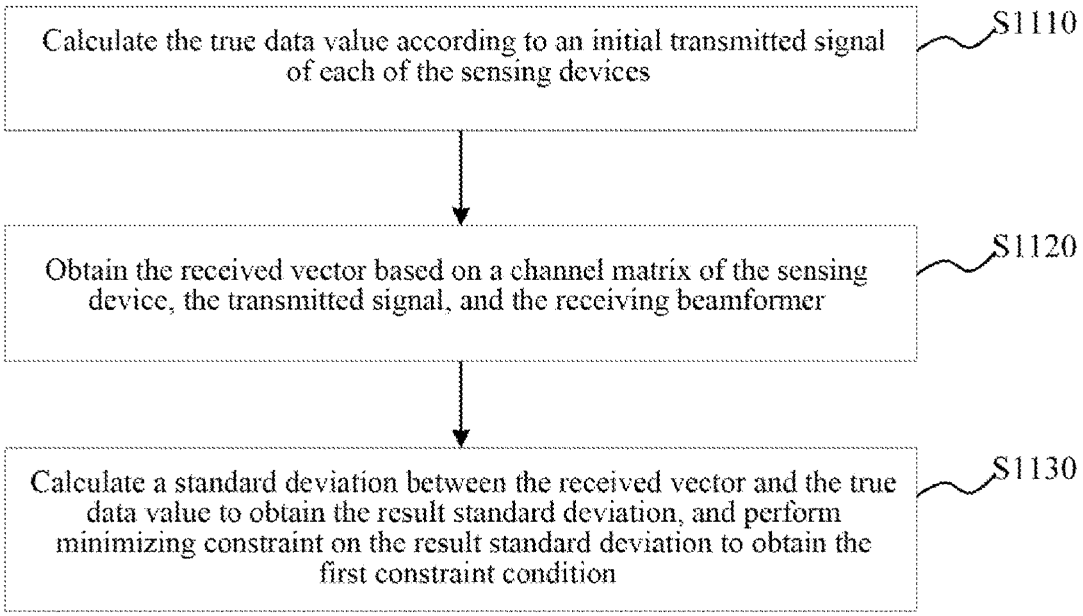
FIG. 3 is a flowchart of step S110 in FIG. 2.

In an embodiment, referring to FIG. 3, step S110 includes steps S1110 to S1130:

At step S1110, the true data value is calculated according to the initial transmitted signal of each of the sensing devices.

In an embodiment, given a radar signal duration T, the symbol sent by the $m^{th}$ sensing device 120 may be expressed as a $N_t$×T-order matrix $S_m=[s_m(1), \ldots, s_m(T)]$. After beamforming, the transmitted signal may be expressed as a $N_t$×T-order matrix $X_m=W_mS_m$, where $W_m$ represents the $N_t$×$N_t$-order transmitting beamformer.

Therefore, the true data value is expressed as:

$$\sum_{m=1}^{M} s_m$$

At step S1120, the received vector is obtained based on a channel matrix of the sensing device, the transmitted signal, and the receiving beamformer.

In an embodiment, since the sensing devices 120 are very far away from the server 130, the intensity of the radar signals reflected by the target at the server side is negligible. Therefore, the received vector ŝ(t) aggregated by the receiving beamformer received by the server 130 is expressed as:

$$\hat{s}(t) = \sum_{m=1}^{M} A^H H_m W_m s_m(t) + A^H n_c(t)$$

where $H_m$ is a $N_a \times N_t$-order channel matrix between the server and the $m^{th}$ sensing device, A is the $N_a \times N_t$-order receiving beamformer of the server, and $n_c(t)$ is a $N_a$-dimensional additive white Gaussian noise vector, which obeys a distribution $$\mathcal{N}_{N_a}(0, \sigma_c^2 I)$$

and is statistically independent of $s_m(t)$.

At step S1130, a standard deviation between the received vector and the true data value is calculated to obtain the result standard deviation, and minimizing constraint is performed on the result standard deviation to obtain the first constraint condition.

In an embodiment, the result standard deviation is expressed as:

$$\mathbb{E}_t\left[\left|\sum_{m=1}^{M} A^H H_m W_m s_m(t) + A^H n_c(t) - \sum_{m=1}^{M} s_m(t)\right|^2\right] = \sum_{m=1}^{M} \|A^H H_m W_m - I_{N_t}\|_F^2 + \sigma_c^2 \|A\|_F^2.$$

where $\| \ \|_F$ represents a norm.

The first constraint condition obtained by performing minimizing constraint on the result standard deviation is expressed as:

$$\min_{A, \{W_m\}} \sum_{m=1}^{M} \|A^H H_m W_m - I_{N_t}\|_F^2 + \sigma_c^2 \|A\|_F^2$$

At step S120, a covariance matrix of the transmitted signal is calculated according to the transmitting beamformer, and a first restrictive condition and a second restrictive condition are obtained based on the covariance matrix.

In an embodiment, the covariance matrix $R_m$ is expressed as:

$$R_m = \frac{1}{T} X_m X_m^H = \frac{1}{T} W_m S_m S_m^H W_m^H \approx W_m W_m^H$$

The radar has two operating modes: an omnidirectional mode and a directional mode. In the omnidirectional mode, the radar antenna transmits and receives signals in all directions at equivalent radiation intensity. In this mode, the radar can detect targets from the whole coverage area, but cannot identify or distinguish the directions of the targets. Therefore, the omnidirectional mode of the radar is usually used in applications such as short-range target search and short-range communication. In the directional mode, the radar antenna only transmits and receives signals in a specific direction. In this mode, the radar can effectively locate a target and acquire direction information of the target. Therefore, the directional mode of the radar is usually used in applications such as long-range target detection and fire control and guidance. Therefore, different restrictive conditions for the two different operating modes are generated in step S120 in the above embodiment.

In an embodiment, in the omnidirectional mode, the waveform of each transmitted signal is an orthogonal matrix, thus meeting $$W_m W_m^H = R_m = P / N_t I_{N_t},$$

where $R_m$ is a covariance matrix, P is total transmission power, and $I_{N_t}$ is a $N_t \times N_t$-order identity matrix. The first restrictive condition is expressed as:

$$W_m W_m^H = P / N_t I_{N_t}, \forall m$$

In an embodiment, in the directional mode, the covariance matrix $R_m$ is set as a Hermitian positive definite covariance matrix, so the second restrictive condition is expressed as:

$$W_m W_m^H = R_m, \forall m$$

Described below is the process of jointly designing the transmitting beamformer and the receiving beamformer in the different operating modes based on the above-mentioned first constraint condition and restrictive conditions, so that the error of over-the-air computation can be minimized after beamforming.

The first mode will be described first.

At step S130, if the integrated communication, sensing and computation system operates in the first mode, a first optimization condition set is constructed according to the first constraint condition and the first restrictive condition, and the first optimization condition set is solved in a first alternating optimization process to obtain a first beamforming weight optimization value for the receiving beamformer and a second beamforming weight optimization value for the transmitting beamformer.

In an embodiment, the constructed first optimization condition set is expressed as:

$$\min_{A, \{W_m\}} \sum_{m=1}^{M} \|A^H H_m W_m - I_{N_t}\|_F^2 + \sigma_c^2 \|A\|_F^2$$
$$\text{s.t. } W_m W_m^H = P / N_t I_{N_t}, \forall m$$

Figure 4:
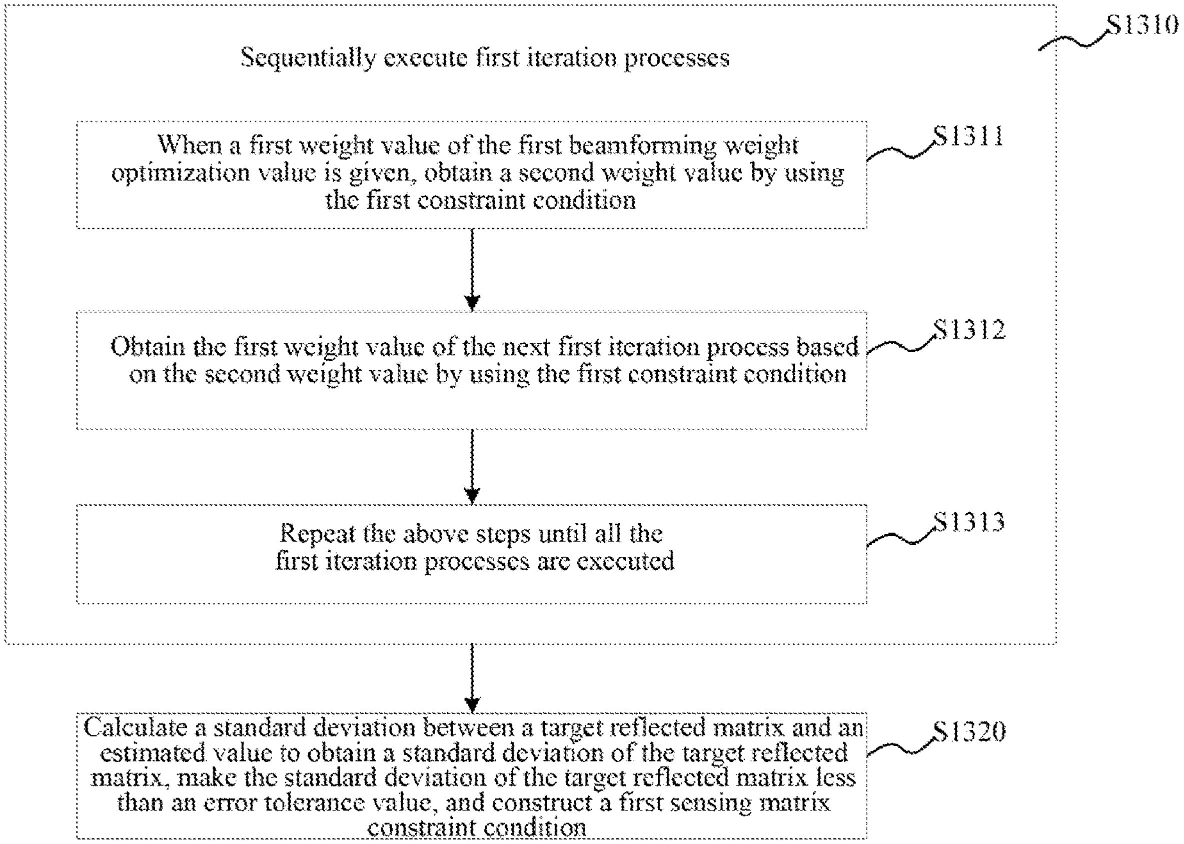
FIG. 4 is a flowchart of step S130 in FIG. 2.

Because of the presence of equality restrictions, the optimization problem based on the first optimization condition set is non-convex, and the optimal solution is obtained by means of the concept of alternating optimization. In an embodiment, the first alternating optimization process includes a plurality of first iteration processes. Referring to FIG. 4, step S130 includes the following steps.

At step S1310, the first iteration processes are executed sequentially, steps S1311 to S1315 below are executed in each first iteration process, and the first iteration process of the $k^{th}$ round is taken as an example for illustration.

At step S1311, when a first weight value of the first beamforming weight optimization value is given, a second weight value is obtained by using the first constraint condition.

In an embodiment, in the first iteration process of the $k^{th}$ round, when the first weight value $A^k$ of the first beamforming weight optimization value is given, the first weight value $A^k$ is substituted into the first constraint condition, so that the first constraint condition is transformed into the following formula:

$$\min_{W_m} \sum_{m=1}^{M} \left\| (A^K)^H H_m W_m - I_{N_t} \right\|_F^2$$

By taking the derivative of the above formula and making the derivative zero, in conjunction with the first restrictive condition, the second weight value is obtained, which is expressed as:

$$W_m^k = \sqrt{\frac{P}{N_t}}\, U_m I_{N_t} V_m^H$$

where $$U_m \Sigma_m V_m^H$$

is the singular value decomposition of $$H_m^H A^K,$$

$\Sigma_m$ represents the eigenvalue after singular value decomposition, and $U_m$ and $V_m$ are $N_t \times N_t$-order unitary matrices.

It can be understood that in the first iteration process of the first round, the given first weight value $A^k$ of the first beamforming weight optimization value may be an empirical value set according to actual requirements.

At step S1312, the first weight value of the next first iteration process is obtained based on the second weight value by using the first constraint condition.

In an embodiment, the second weight value $$W_m^k$$

of the transmitter is substituted into the first constraint condition to obtain:

$$\min_{A} \sum_{m=1}^{M} \left\| A^H H_m W_m^k - I_{N_t} \right\|_F^2 + \sigma_c^2 \|A\|_F^2$$

By taking the derivative of the above formula and making the derivative zero, the first weight value of the next first iteration process is obtained, which is expressed as:

$$(A^{k+1})^H = \sum_{m=1}^{M} (H_m W_m^k)^H \left( \sum_{m=1}^{M} \frac{P}{N_t} H_m H_m^H + \sigma_c^2 I \right)^{-1}$$

At step S1313, the above steps are repeated until all the first iteration processes are executed.

At step S1320, the first beamforming weight optimization value is obtained according to the first weight value of each of the first iteration processes, and the second beamforming weight optimization value is obtained according to the second weight value of each of the first iteration processes.

In an embodiment, since a first weight value and a second weight value can be obtained in the first iteration process of each round, the first beamforming weight optimization value can be obtained according to the first weight value of each of the first iteration processes, and the second beamforming weight optimization value can be obtained according to the second weight value of each of the first iteration processes.

Next, the second mode will be described.

At step S140, if the integrated communication, sensing and computation system operates in the second mode, a second optimization condition set is constructed according to the first constraint condition and the second restrictive condition, and the second optimization condition set is solved to obtain a third beamforming weight optimization value for the receiving beamformer and a fourth beamforming weight optimization value for the transmitting beamformer.

In an embodiment, according to the first constraint condition and the second restrictive condition, the second optimization condition set is constructed, which is expressed as:

$$\min_{A,\{W_m\}} \sum_{m=1}^{M} \left\| A^H H_m W_m - I_{N_t} \right\|_F^2 + \sigma_c^2 \|A\|_F^2$$

$$\text{s.t. } W_m W_m^H = R_m,\ \forall m$$

Figure 5:
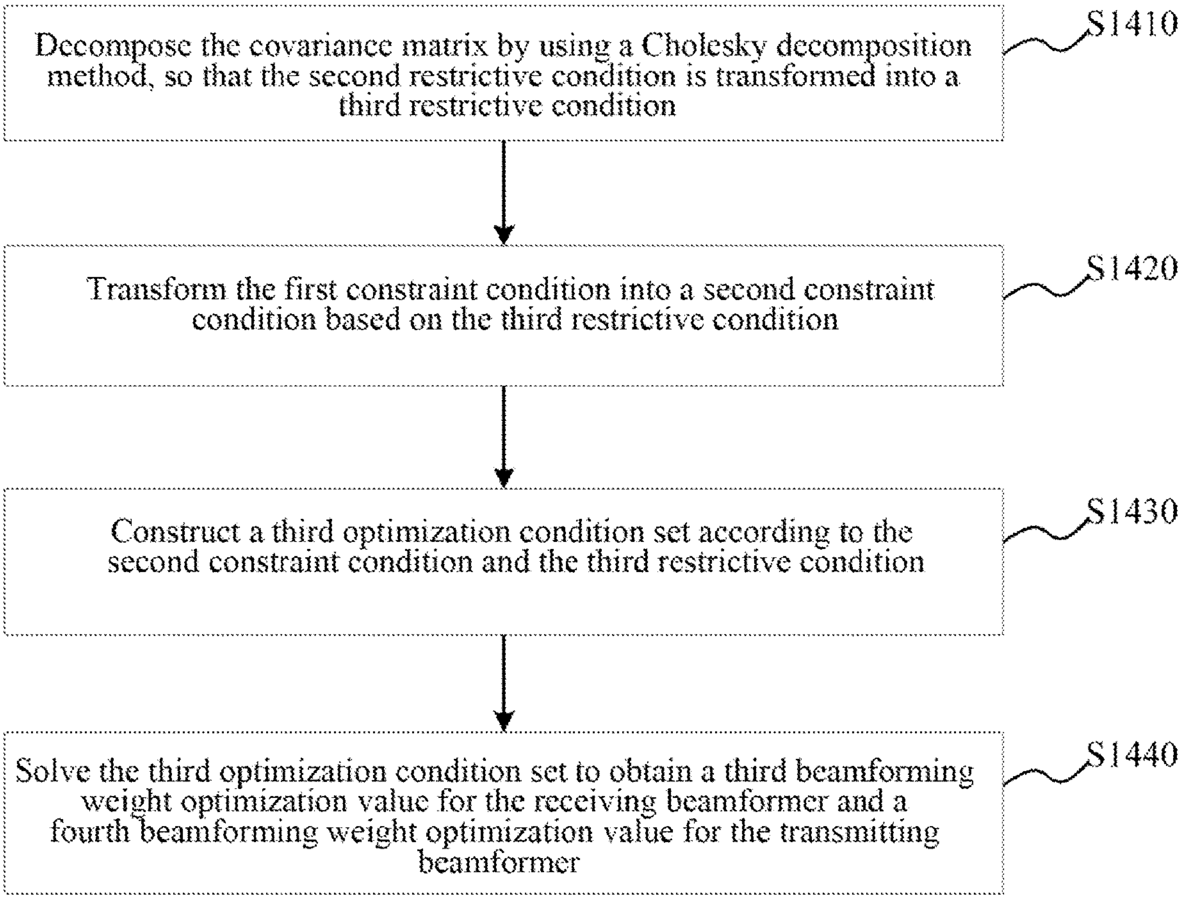
FIG. 5 is a flowchart of step S140 in FIG. 2.

Because of the presence of equality restrictions, the optimization problem based on the second optimization condition set is non-convex, and the optimal solution is obtained by means of the concept of alternating optimization. In an embodiment, referring to FIG. 5, step S140 includes the following steps.

At step S1410, the covariance matrix is decomposed by using a Cholesky decomposition method, so that the second restrictive condition is transformed into a third restrictive condition.

In an embodiment, the idea of the Cholesky decomposition method is to decompose a symmetric positive definite matrix into the product of a lower triangular matrix and a transposed matrix thereof. Therefore, by using the Cholesky decomposition method, the covariance matrix $R_m$ is decomposed into $$R_m = Q_m Q_m^H,$$

where $Q_m$ is a $N_t \times N_t$-order lower triangular matrix.

At this point, the second restrictive condition is transformed into a third restrictive condition, which is expressed as:

$$Q_m^{-1}W_mW_m^HQ_m^{-H}=\tilde{W}_m\tilde{W}_m^H=I_{N_t},\forall m$$

At step S1420, the first constraint condition is transformed into a second constraint condition based on the third restrictive condition.

In an embodiment, assuming $$\tilde{W}_m=Q_m^{-1}W_m,$$

the first constraint condition is transformed into a second constraint condition, which is expressed as:

$$\min_{A,\{\tilde{W}_m\}}\sum_{m=1}^{M}\left\|A^HH_mQ_m\tilde{W}_m-I_{N_t}\right\|_F^2+\sigma_c^2\|A\|_F^2$$

At step S1430, a third optimization condition set is constructed according to the second constraint condition and the third restrictive condition.

In an embodiment, the third optimization condition set is expressed as:

$$\min_{A,\{\tilde{W}_m\}}\sum_{m=1}^{M}\left\|A^HH_mQ_m\tilde{W}_m-I_{N_t}\right\|_F^2+\sigma_c^2\|A\|_F^2$$

$$\text{s.t. }\tilde{W}_m\tilde{W}_m^H=I_{N_t},\forall m$$

At step S1440, the third optimization condition set is solved to obtain a third beamforming weight optimization value for the receiving beamformer and a fourth beamforming weight optimization value for the transmitting beamformer.

Figure 6:
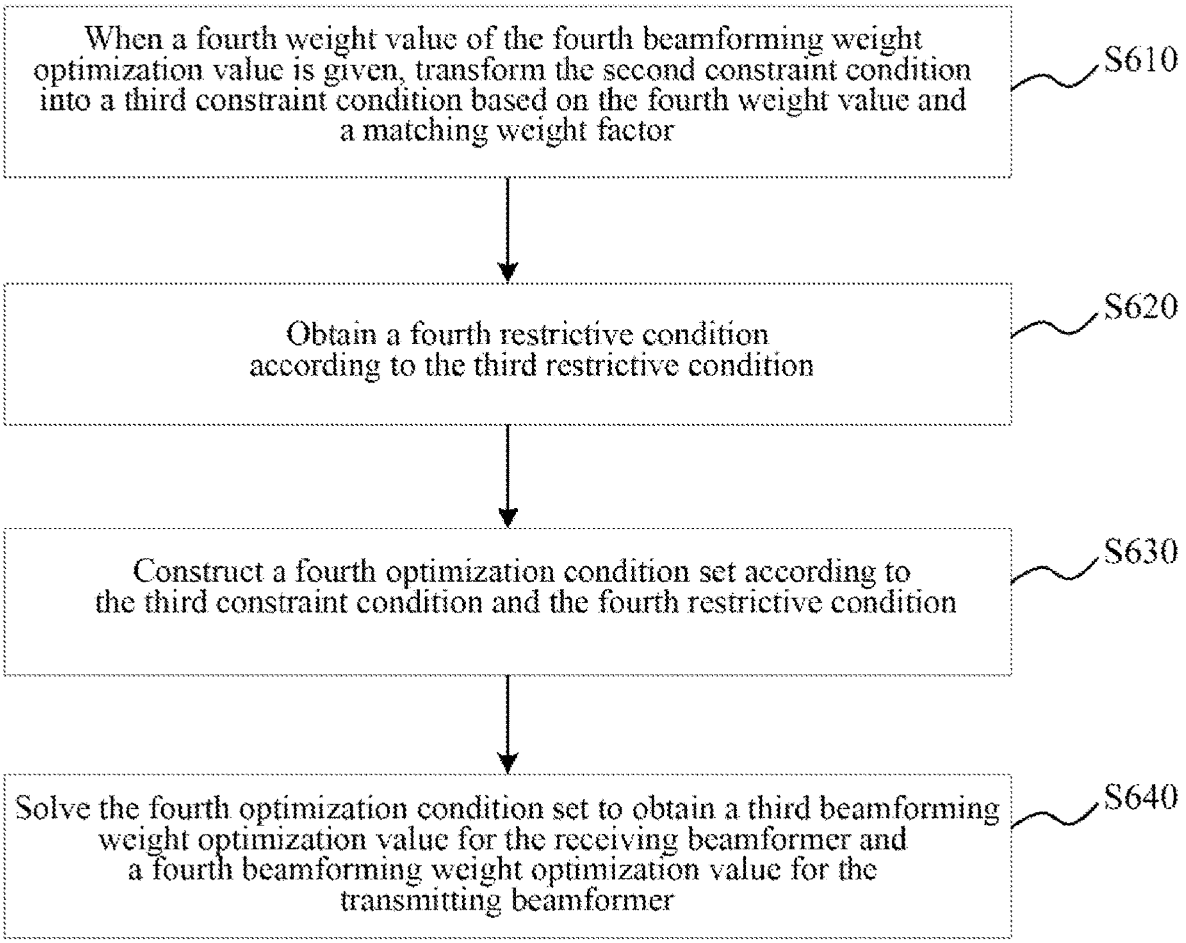
FIG. 6 is a flowchart of step S1440 in FIG. 5.

In an embodiment, referring to FIG. 6, step S1440 includes the following steps.

At step S610, when a fourth weight value of the fourth beamforming weight optimization value is given, the second constraint condition is transformed into a third constraint condition based on the fourth weight value and a matching weight factor.

In an embodiment, when a fourth weight value $$W_m^*$$

of the fourth beamforming weight optimization value that can optimize the performance of radar sensing is given, and the error of over-the-air computation is defined as a function $\mathcal{F}(A,\{W_m\})$, i.e.

$$\mathcal{F}(A,\{W_m\})=\sum_{m=1}^{M}\left\|A^HH_mW_m-I_{N_t}\right\|_F^2+\sigma_c^2\|A\|_F^2$$

the second constraint condition is transformed into a third constraint condition, which is expressed as:

$$\min_{A,\{W_m\}}\rho\mathcal{F}(A,\{W_m\})+(1-\rho)\sum_{m=1}^{M}\|W_m-W_m^*\|_F^2$$

where $\rho\in[0,1]$ is a weight factor between the error of over-the-air computation and the matching error of radar sensing, which may be set according to actual situations.

At step S620, a fourth restrictive condition is obtained according to the third restrictive condition.

In an embodiment, the third restrictive condition is expressed as a norm, obtaining a fourth restrictive condition, which is expressed as:

$$\|W_m\|_F^2\le P,\forall m$$

At step S630, a fourth optimization condition set is constructed according to the third constraint condition and the fourth restrictive condition.

In an embodiment, the fourth optimization condition set is expressed as:

$$\min_{A,\{W_m\}}\rho\mathcal{F}(A,\{W_m\})+(1-\rho)\sum_{m=1}^{M}\|W_m-W_m^*\|_F^2$$

$$\text{s.t. }\|W_m\|_F^2\le P,\forall m$$

At step S640, the fourth optimization condition set is solved to obtain a third beamforming weight optimization value for the receiving beamformer and a fourth beamforming weight optimization value for the transmitting beamformer.

Figure 7:
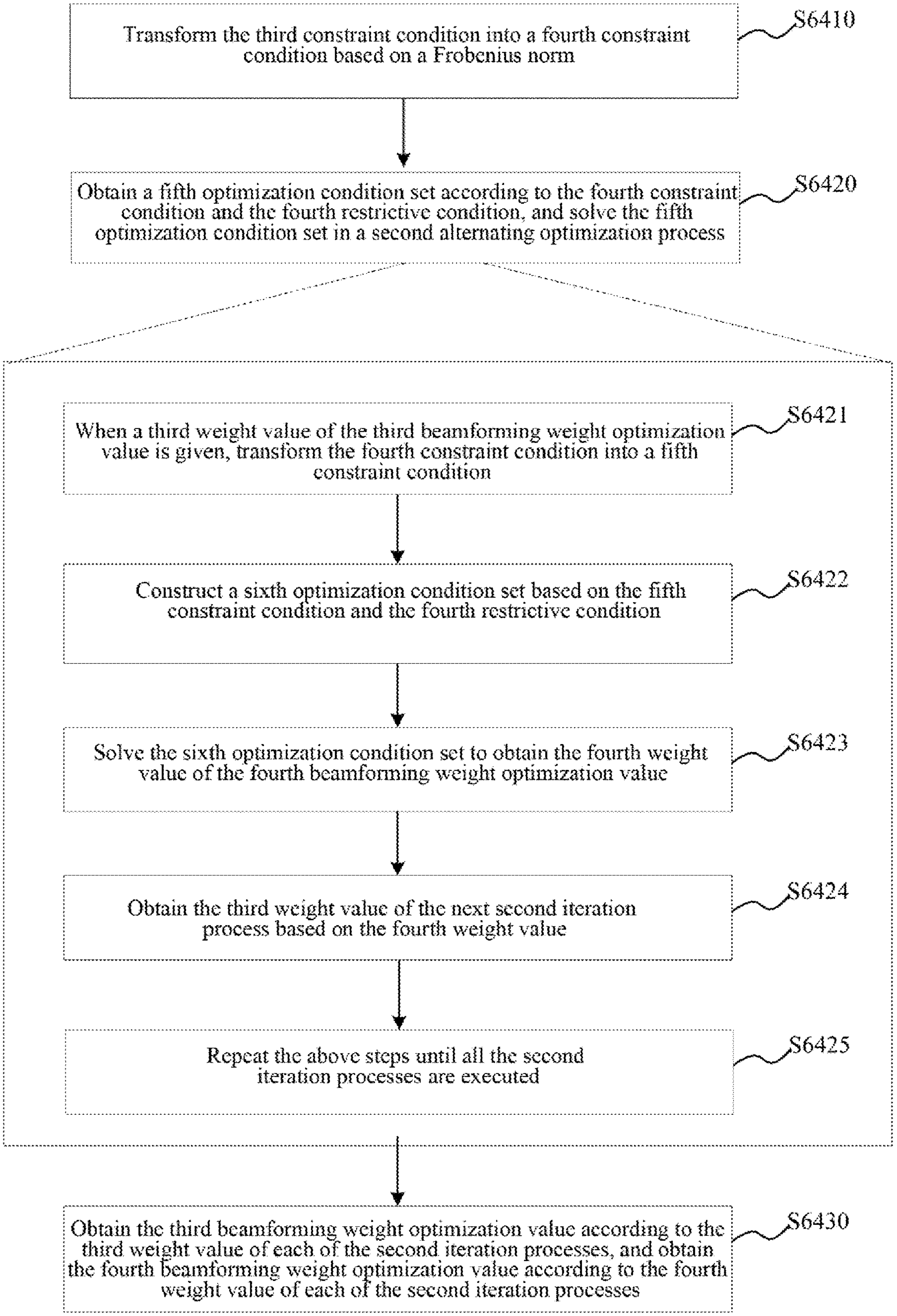
FIG. 7 is a flowchart of step S640 in FIG. 6.

In an embodiment, referring to FIG. 7, step S640 includes the following steps.

At step S6410, the third constraint condition is transformed into a fourth constraint condition based on a Frobenius norm.

In an embodiment, based on the Frobenius norm, the following condition is defined:

$$\rho\left\|A^HH_mW_m-I_{N_t}\right\|_F^2+(1-\rho)\|W_m-W_m^*\|_F^2=\|Z_m(A)W_m-B_m\|_F^2$$

where $Z_m(A)=[\sqrt{\rho}(A^HH_m)^T,\sqrt{1-\rho}I_{N_t}]^T$ is a $2N_t\times N_t$-order matrix, and $B_m=[\sqrt{\rho}I_{N_t},\sqrt{1-\rho}(W_m^*)^T]^T$ is a $2N_t\times N_t$-order matrix.

Therefore, the third constraint condition is transformed into a fourth constraint condition, which is expressed as:

$$\min_{A,\{W_m\}}\|Z_m(A)W_m-B_m\|_F^2+\rho\sigma_c^2\|A\|_F^2$$

At step S6420, a fifth optimization condition set is obtained according to the fourth constraint condition and the fourth restrictive condition, and the fifth optimization condition set is solved in a second alternating optimization process.

In an embodiment, the fifth optimization condition set is expressed as:

$$\min_{A,\{W_m\}} \|Z_m(A)W_m - B_m\|_F^2 + \rho\sigma_c^2\|A\|_F^2$$
$$\text{s.t. } \|W_m\|_F^2 \le P, \forall m$$

In an embodiment, the optimization problem is non-convex due to the coupling relationship between $Z_m(A)$ and $W_m$, so the optimal solution is obtained in an alternating optimization manner. The second alternating optimization process includes a plurality of second iteration processes, which include the following steps.

At step S6421, when a third weight value of the third beamforming weight optimization value is given, the fourth constraint condition is transformed into a fifth constraint condition.

In an embodiment, in the $k^{th}$ round of iteration, when a third weight value $A^k$ of the third beamforming weight optimization value is given, the fourth constraint condition is transformed into a fifth constraint condition, which is expressed as:

$$\min_{W_m} \|Z_m(A^k)W_m - B_m\|_F^2$$

At step S6422, a sixth optimization condition set is constructed based on the fifth constraint condition and the fourth restrictive condition.

In an embodiment, the sixth optimization condition set is expressed as:

$$\min_{W_m} \|Z_m(A^k)W_m - B_m\|_F^2$$
$$\text{s.t. } \|W_m\|_F^2 \le P, \forall m$$

At step 6423, the sixth optimization condition set is solved to obtain the fourth weight value of the fourth beamforming weight optimization value.

In an embodiment, because the sixth optimization condition set is a quadratically constrained quadratic programming convex optimization problem, its optimal solution may be obtained by projected gradient descent. In the $k^{th}$ round of iteration, the fourth weight value of the $(k+1)^{th}$ round may be obtained by calculating the gradient of the error of over-the-air computation, which is expressed as:

$$W_m^{k+1} = P_\Omega\left(W_m^k - \alpha\nabla\mathcal{F}\left(W_m^k\right)\right)$$

where $$\Omega = \left\{W_m \,\middle|\, \|W_m\|_F^2 \le P\right\}$$

is a feasible region of the optimization problem of the sixth optimization condition set, and a represents a step size of gradient descent.

At step S6424, the third weight value of the next second iteration process is obtained based on the fourth weight value.

In an embodiment, let $$Z_m^k = Z_m\left(A^k\right) \text{ and } F_m^k = H_m W_m^k,$$

based on updated $W_m$, the third weight value may be obtained by the following formula:

$$\left(A^{k+1}\right)^H = \operatorname{argmin}\mathcal{F}(A, \{W_m\}) = \sum_{m=1}^{M}\left(F_m^k\right)^H\left(\sum_{m=1}^{M}F_m^k\left(F_m^k\right)^H + \sigma_c^2 I\right)^{-1}$$

At step S6425, the above steps are repeated until all the second iteration processes are executed.

It can be understood that in the second iteration process of the first round, the given third weight value $A^k$ and fourth weight value $$W_m^k$$

of the third beamforming weight optimization value may be empirical values set according to actual requirements.

At step S6430, the third beamforming weight optimization value is obtained according to the third weight value of each of the second iteration processes, and the fourth beamforming weight optimization value is obtained according to the fourth weight value of each of the second iteration processes.

Through the above process, the third beamforming weight optimization value for the receiving beamformer and the fourth beamforming weight optimization value for the transmitting beamformer in the second mode can be obtained. Therefore, by the joint design of beamforming is performed on the antennas of the receiver and the transmitter in the embodiment of the present disclosure, the performance of over-the-air computation can be improved.

At step S150, a transmitted waveform for the transmitted signal is generated by using the second beamforming weight optimization value for the transmitting beamformer in the first mode, or a transmitted waveform for the transmitted signal is generated by using the fourth beamforming weight optimization value for the transmitting beamformer in the second mode.

In an embodiment, after the transmitting beamformer $W_m$ is obtained, a covariance matrix $R_m$ may be calculated, and then a transmitted waveform for the transmitted signal may be obtained, which is expressed as:

$$E_m(\theta)=\alpha(\theta)R_m\alpha^H(\theta)$$

where $\alpha(\theta)=[1, e^{j2\pi\Delta \sin\theta}, \ldots, e^{j2\pi(N_t-1)\Delta \sin\theta}]^T$ is a $N_t$-dimensional direction vector of the transmitting antennas, A is a ratio of antenna gap to signal wavelength, and θ is an azimuth angle of the target.

In the embodiment of the present disclosure, firstly, the radar waveform design in the omnidirectional mode for initial omnidirectional detection is studied. Secondly, focusing on the target of interest, the radar waveform design in the directional mode is further studied. Compared with the omni-directional waveform design, the performance of the directional waveform design for over-the-air computation is limited. In the embodiment of the present disclosure, radar sensing and over-the-air computation accuracy are balanced by the joint design of beamforming for the antennas of the receiver and the transmitter.

The waveform design method according to the embodiment of the present disclosure will be described below through a specific scenario.

Figure 8:
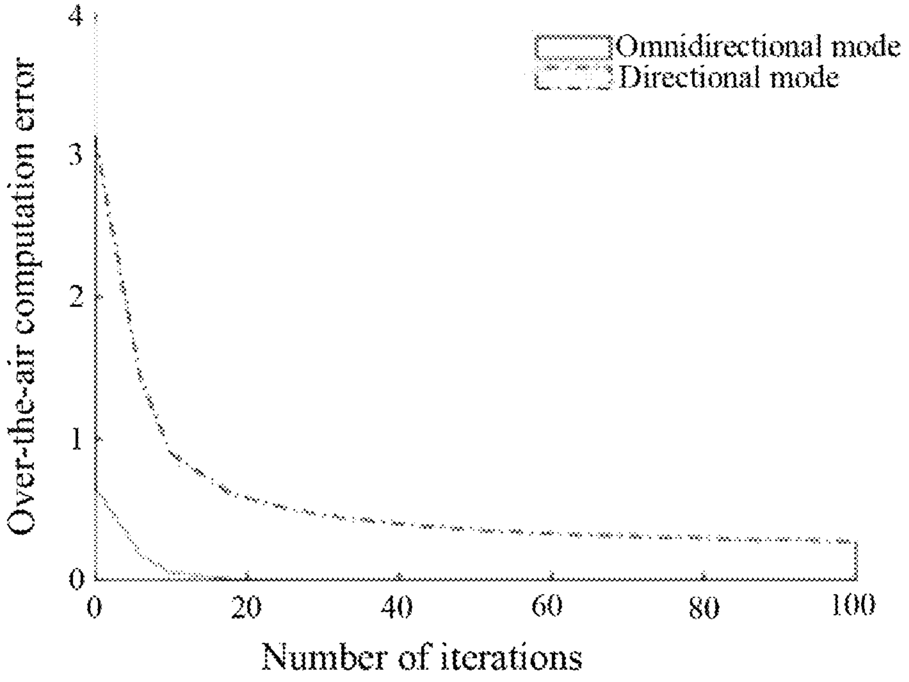
FIG. 8 schematically shows the convergence of an alternating optimization method of the waveform design method in waveform design according to yet another embodiment of the present disclosure.

FIG. 8 schematically shows the convergence of an alternating optimization method in the waveform design in the embodiment of the present disclosure. In this region graph, the over-the-air computation errors of the first mode and the second mode are stacked. In addition, the reason why the over-the-air computation error of the second mode is greater than that of the first mode is that the directional beam has higher requirements for the design of the transmitting beamformer. It can be found that the alternating optimization method based on the embodiment of the present disclosure can converge after iteration, and the more iterations, the smaller the error of over-the-air computation. Therefore, the joint design of beamforming for the antennas of the receiver and the transmitter in the embodiment of the present disclosure can improve the performance of over-the-air computation.

In an application scenario of integrated communication, sensing and computation, multiple multi-antenna sensing devices simultaneously transmit sensing signals for target detection and communication signals for data transmission, with the sensing signals being received by the sensing devices after being reflected by the target and the communication signals being received by the server after over-the-air computation. The sensors extract target information according to the received signals, and the server speculates the statistical information of the data of sensing devices according to a received over-the-air computation result. In the related art, radar sensing signals and data transmission signals will compete for spectrum resources, which will increase the burden of wireless channels and lead to the more congestion of communication links. In the embodiments of the present disclosure, on the premise of ensuring sensing accuracy, the error of over-the-air computation is minimized, the performance of over-the-air computation and the efficiency of data processing are improved, and therefore, the efficiency of resource utilization is increased.

According to the technical solution provided by the embodiments of the present disclosure, a first constraint condition related to a receiving beamformer and two restrictive conditions related to a transmitting beamformer are constructed, a first optimization condition set and a second optimization condition set are constructed according to the first constraint condition and the different restrictive conditions, the first optimization condition set and the second optimization condition set are solved respectively in the different operating modes, so that the optimization values for the receiving beamformer and the transmitting beamformer in the different operating modes are obtained, and then a transmitted waveform is designed. According to the embodiments of the present disclosure, the beamforming of the transmitter and the beamforming of the receiver are designed to simultaneously adjust the antennas of the transmitter and the receiver. Consequently, on the premise of ensuring sensing accuracy, the error of over-the-air computation is minimized, the performance of over-the-air computation and the efficiency of data processing are improved, and therefore, the efficiency of resource utilization is increased.

Figure 9:
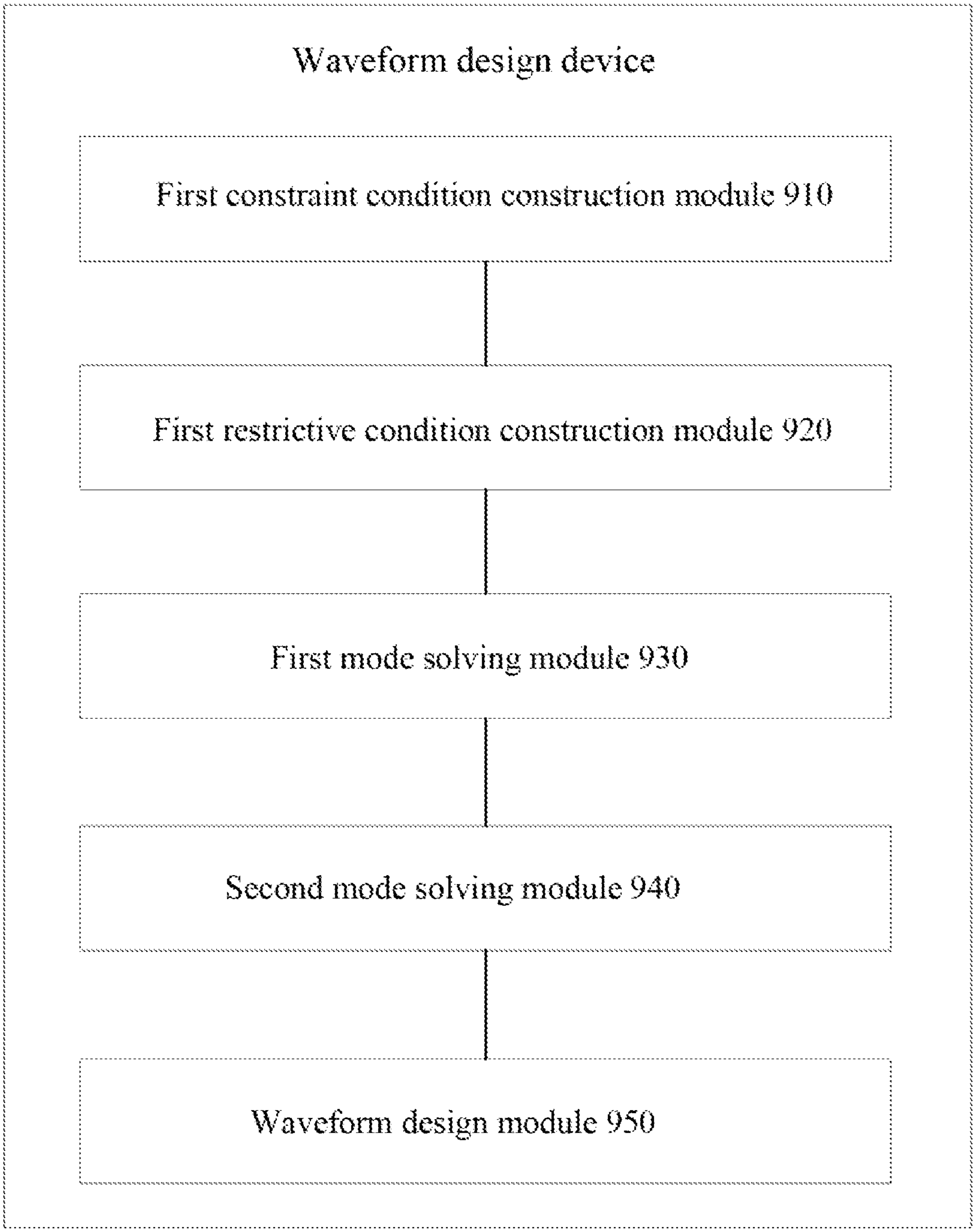
FIG. 9 is a structural block diagram of a waveform design device according to yet another embodiment of the present disclosure.

An embodiment of the present disclosure further provides a waveform design device which can implement the above waveform design method, referring to FIG. 9, applied to the integrated communication, sensing and computation system as shown in FIG. 1. The integrated communication, sensing and computation system includes a transmitting beamformer, a receiving beamformer, and multiple sensing devices. A transmitted signal of the sensing device is obtained by performing beamforming on an initial transmitted signal by using the transmitting beamformer. The waveform design device includes:

a first constraint condition construction module 910, configured to acquire a received vector aggregated by the receiving beamformer, calculate a result standard deviation between the received vector and a true data value, and minimize the result standard deviation to construct a first constraint condition;

a first restrictive condition construction module 920, configured to calculate a covariance matrix of the transmitted signal according to the transmitting beamformer, and obtain a first restrictive condition and a second restrictive condition based on the covariance matrix and total transmission power;

a first mode solving module 930, configured to, if the integrated communication, sensing and computation system operates in a first mode, construct a first optimization condition set according to the first constraint condition and the first restrictive condition, and solve the first optimization condition set in a first alternating optimization process to obtain a first beamforming weight optimization value for the receiving beamformer and a second beamforming weight optimization value for the transmitting beamformer;

a second mode solving module 940, configured to, if the integrated communication, sensing and computation system operates in a second mode, construct a second optimization condition set according to the first constraint condition and the second restrictive condition, and solve the second optimization condition set to obtain a third beamforming weight optimization value for the receiving beamformer and a fourth beamforming weight optimization value for the transmitting beamformer; and a waveform design module 950, configured to generate a transmitted waveform for the transmitted signal by using the second beamforming weight optimization value for the transmitting beamformer in the first mode, or generate a transmitted waveform for the transmitted signal by using the fourth beamforming weight optimization value for the transmitting beamformer in the second mode.

The specific implementation of the waveform design device of this embodiment is substantially the same as the specific implementation of the above waveform design method, which will not be repeated herein.

An embodiment of the present disclosure further provides an electronic device, including:

at least one memory;

at least one processor; and at least one program.

The program is stored in the memory, and the processor executes the at least one program to implement the above waveform design method according to the present disclosure. The electronic device may be any smart terminal including a mobile phone, a tablet computer, a personal digital assistant (PDA), a vehicle-mounted computer, etc.

Figure 10:
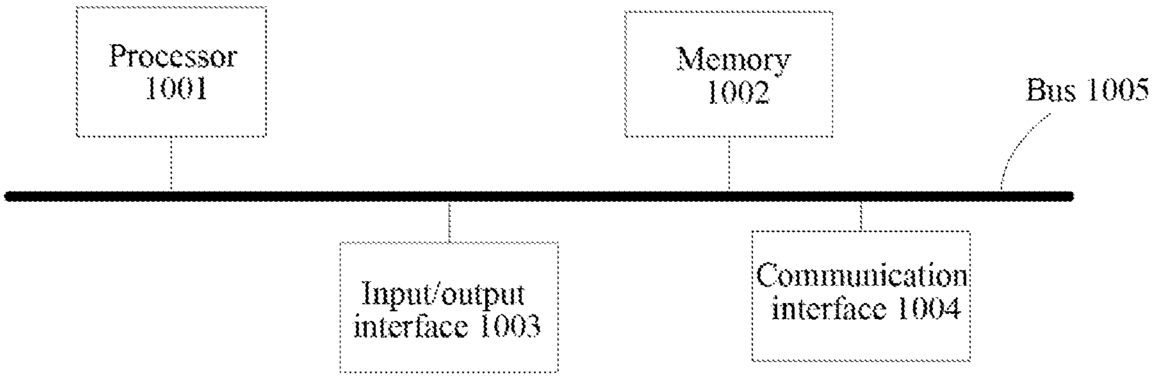
FIG. 10 is a schematic diagram of the hardware structure of an electronic device according to an embodiment of the present disclosure.

Referring to FIG. 10, FIG. 10 schematically shows a hardware structure of an electronic device according to another embodiment. The electronic device includes:

a processor 1001, capable of being implemented by a general-purpose Central Processing Unit (CPU), a microprocessor, an application specific integrated circuit (ASIC), or one or more integrated circuits, and configured to execute a related program to implement the technical solution provided by the embodiments of the present disclosure;

a memory 1002, capable of being implemented in the form of a Read Only Memory (ROM), a static storage device, a dynamic storage device or a Random Access Memory (RAM), where the memory 1002 may store an operating system and other applications, and when the technical solution provided by the embodiments of the present specification is implemented by software or firmware, related program codes are stored in the memory 1002, and are invoked by the processor 1001 to perform the waveform design method of the embodiment of the present disclosure;

an input/output interface 1003, configured to input and output information;

a communication interface 1004, configured to implement communication interaction between the device and other devices, and capable of implementing communication in a wired manner (e.g. a USB, a network cable, or the like) or a wireless manner (e.g. a mobile network, WIFI, Bluetooth, or the like); and a bus 1005, configured to transmit information between the various components of the device (e.g. the processor 1001, the memory 1002, the input/output interface 1003 and the communication interface 1004).

The processor 1001, the memory 1002, the input/output interface 1003 and the communication interface 1004 are in communication connection with one another through the bus 1005 inside the device.

An embodiment of the present disclosure further provides a storage medium, which is a computer-readable storage medium. The storage medium stores a computer program which, when executed by a processor, causes the processor to implement the above waveform design method.

As a non-transitory computer-readable storage medium, the memory may be configured to store a non-transitory software program and a non-transitory computer-executable program. In addition, the memory may include a high-speed random access memory, and may also include a non-transitory memory, e.g. at least one disk storage device, flash memory device or other non-transitory solid-state storage devices. In some embodiments, the memory optionally includes memories disposed remotely relative to the processor, and these remote memories may be connected to the processor through a network. Examples of the above network include, but not limited to, the Internet, an intranet, a local area network, a mobile communication network, and combinations thereof.

According to the waveform design method, the integrated communication, sensing and computation system and the related device proposed by the embodiments of the present disclosure, a first constraint condition related to a receiving beamformer and two restrictive conditions related to a transmitting beamformer are constructed, a first optimization condition set and a second optimization condition set are constructed according to the first constraint condition and the different restrictive conditions, and the first optimization condition set and the second optimization condition set are solved respectively in the different operating modes, so that the optimization values for the receiving beamformer and the transmitting beamformer in the different operating modes are obtained. According to the embodiments of the present disclosure, the beamforming of the transmitter and the beamforming of the receiver are designed to simultaneously adjust the antennas of the transmitter and the receiver. Consequently, on the premise of ensuring sensing accuracy, the error of over-the-air computation is minimized, the performance of over-the-air computation and the efficiency of data processing are improved, and therefore, the efficiency of resource utilization is increased.

The embodiments described in the embodiments of the present disclosure are intended to explain the technical solution of the embodiments of the present disclosure more clearly rather than constitute a limitation to the technical solution provided by the embodiments of the present disclosure. As will be known by those having ordinary skill in the art, with the evolution of technology and the emergence of new application scenarios, the technical solution provided by the embodiments of the present disclosure is also applicable to similar technical problems.

It can be understood by those having ordinary skill in the art that the technical solution shown in the accompanying drawings does not constitute a limitation to the embodiments of the present disclosure, and may include more or less steps than those shown, a combination of some steps, or different components.

The device embodiment described above is merely schematic in which the units illustrated as separate components may or may not be physically separated, that is, the units may be located in one place or distributed on a plurality of network units. Some or all of the modules may be selected according to actual needs to achieve the objective of the solution of the embodiment of the present disclosure.

It can be understood by those having ordinary skill in the art that all or some of the steps in the methods and the functional modules/units in the system and device disclosed above may be implemented as software, firmware, hardware and their appropriate combinations.

The terms “first”, “second”, “third”, “fourth” and the like in the specification of the present disclosure and the above accompanying drawings are used to distinguish similar objects, and are not necessarily used to describe a specific order or sequence. It should be understood that the data used in this way can be interchanged under appropriate circumstances, so that the embodiments of the present disclosure described herein can be implemented in other orders than those illustrated or described herein. Furthermore, the terms “include”, “has” and any variations thereof are intended to cover non-exclusive inclusion. For example, processes, methods, systems, products or devices that include a series of steps or units are not necessarily limited to those explicitly listed, but may include other steps or units not explicitly listed or inherent to these processes, methods, products or devices.

It should be understood that in the present disclosure, “at least one (item)” refers to one or more, and “a plurality of” refers to two or more. “And/or” is used to describe the association relationship between associated objects, indicating that there may be three relationships. For example, “A and/or B” may indicate that only A is present, only B is present, and both A and B are present, where A and B may be singular or plural. The character “/” generally indicates that the associated objects at both sides are in an “or” relationship. “At least one of the following (items)” or a similar expression thereof refers to any combination of these items, including a single item or any combination of a plurality of items. For example, at least one of a, b or c may indicates a, b, c, “a and b”, “a and c”, “b and c”, or “a, b and c”, where a, b and c may be single or multiple.

In several embodiments provided by the present disclosure, it should be understood that the disclosed device and method may be implemented in other ways. For example, the above device embodiment is merely schematic, for example, the division of the above units is merely one type of logical function division. Other division methods may be implemented in practice, for example, multiple units or components may be combined or integrated into another system, or some features may be omitted, or not executed. In addition, mutual coupling or direct coupling or communication connection shown or discussed may be indirect coupling or communication connection through some interfaces, apparatuses or units, or may be in electrical, mechanical or other forms.

The above units described as separate components may or may not be physically separated, and components displayed as units may or may not be physical units, that is, they may be located at one position or distributed on multiple network units. Some or all of the units may be selected according to actual needs to achieve the object of the solution of the embodiment of the present disclosure.

In addition, functional units in the embodiments of the present disclosure may be integrated into one processing unit, or each unit may exist alone physically, or two or more units may be integrated into one unit. The above integrated units may be implemented in the form of hardware or in the form of functional software units.

If the integrated units are implemented in the form of the functional software units and sold or used as separate products, the integrated units may be stored in a computer-readable storage medium. Based on this understanding, the technical solution of the present disclosure or the parts that contribute to the prior art or all or part of the technical solution may be embodied in the form of a software product in essence. The computer software product is stored in a storage medium, including multiple instructions to make a computer device (e.g. a personal computer, a server, a network device, etc.) perform all or part of the steps of the method of various embodiments of the present disclosure. The above storage medium includes: a USB flash disk, a mobile hard disk, a read-only memory (ROM), a random access memory (RAM), a magnetic disk, an optical disk, or various other media capable of storing the program.

The preferred embodiments among the embodiments of the present disclosure have been described above with reference to the accompanying drawings, which is not intended to limit the protection scope of the embodiments of the present disclosure. Any modification, equivalent substitution and improvement which are made by those having ordinary skill in the art without departing from the scope and essence of the embodiments of the present disclosure shall fall within the protection scope of the embodiments of the present disclosure.

What is claimed is:

1. A waveform design method, applied to an integrated communication, sensing and computation system, wherein the integrated communication, sensing and computation system comprises a transmitting beamformer, a receiving beamformer, and multiple sensing devices, wherein a transmitted signal to each of the sensing devices is obtained by performing beamforming on an initial transmitted signal of each of the sensing devices by the transmitting beamformer, the initial transmitted signal is radar sensing pulse, and the method comprises:

acquiring a received vector aggregated by the receiving beamformer, calculating a result standard deviation between the received vector and a true data value, and minimizing the result standard deviation to construct a first constraint condition;

calculating a covariance matrix of the transmitted signal to each of the sensing devices according to the transmitting beamformer, and obtaining a first restrictive condition and a second restrictive condition based on the covariance matrix;

if the integrated communication, sensing and computation system operates in a first mode, constructing a first optimization condition set according to the first constraint condition and the first restrictive condition, and solving the first optimization condition set in a first alternating optimization process to obtain a first beamforming weight optimization value for the receiving beamformer and a second beamforming weight optimization value for the transmitting beamformer;

if the integrated communication, sensing and computation system operates in a second mode, constructing a second optimization condition set according to the first constraint condition and the second restrictive condition, and solving the second optimization condition set to obtain a third beamforming weight optimization value for the receiving beamformer and a fourth beamforming weight optimization value for the transmitting beamformer; and generating a transmitted waveform for the transmitted signal by using the second beamforming weight optimization value for the transmitting beamformer in the first mode, or generating a transmitted waveform for the transmitted signal by using the fourth beamforming weight optimization value for the transmitting beamformer in the second mode.

2. The waveform design method of claim 1, wherein the steps of acquiring a received vector aggregated by the receiving beamformer, calculating a result standard deviation between the received vector and a true data value, and minimizing the result standard deviation to construct a first constraint condition comprises:

calculating the true data value according to the initial transmitted signal of each of the sensing devices;

obtaining the received vector based on a channel matrix of each of the sensing devices, the initial transmitted signal of each of the sensing devices, and the receiving beamformer; and calculating a standard deviation between the received vector and the true data value to obtain the result standard deviation, and performing minimizing constraint on the result standard deviation to obtain the first constraint condition.

3. The waveform design method of claim 2, wherein the first mode is an omnidirectional mode, and the first alternating optimization process comprises a plurality of first iteration processes; and the constructing a first optimization condition set according to the first constraint condition and the first restrictive condition, and solving the first optimization condition set in a first alternating optimization process to obtain a first beamforming weight optimization value for the receiving beamformer and a second beamforming weight optimization value for the transmitting beamformer comprises:

sequentially executing the first iteration processes, wherein the first iteration processes comprise following steps:

when a first weight value of the first beamforming weight optimization value is given, obtaining a second weight value by using the first constraint condition;

obtaining the first weight value of a next one of the first iteration processes based on the second weight value by using the first constraint condition; and repeating the above steps until all the first iteration processes are executed; and obtaining the first beamforming weight optimization value according to the first weight value of each of the first iteration processes, and obtaining the second beamforming weight optimization value according to the second weight value of each of the first iteration processes.

4. The waveform design method of claim 2, wherein the second mode is a directional mode, and the constructing a second optimization condition set according to the first constraint condition and the second restrictive condition, and solving the second optimization condition set to obtain a third beamforming weight optimization value for the receiving beamformer and a fourth beamforming weight optimization value for the transmitting beamformer comprises:

decomposing the covariance matrix by using a Cholesky decomposition method, so that the second restrictive condition is transformed into a third restrictive condition;

transforming the first constraint condition into a second constraint condition based on the third restrictive condition;

constructing a third optimization condition set according to the second constraint condition and the third restrictive condition; and solving the third optimization condition set to obtain the third beamforming weight optimization value for the receiving beamformer and the fourth beamforming weight optimization value for the transmitting beamformer.

5. The waveform design method of claim 4, wherein the step of solving the third optimization condition set to obtain the third beamforming weight optimization value for the receiving beamformer and the fourth beamforming weight optimization value for the transmitting beamformer comprises:

when a fourth weight value of the fourth beamforming weight optimization value is given, transforming the second constraint condition into a third constraint condition based on the fourth weight value and a matching weight factor;

obtaining a fourth restrictive condition according to the third restrictive condition;

constructing a fourth optimization condition set according to the third constraint condition and the fourth restrictive condition; and solving the fourth optimization condition set to obtain a third beamforming weight optimization value for the receiving beamformer and a fourth beamforming weight optimization value for the transmitting beamformer.

6. The waveform design method of claim 5, wherein the steps of solving the fourth optimization condition set to obtain a third beamforming weight optimization value for the receiving beamformer and a fourth beamforming weight optimization value for the transmitting beamformer comprises:

transforming the third constraint condition into a fourth constraint condition based on a Frobenius norm;

obtaining a fifth optimization condition set according to the fourth constraint condition and the fourth restrictive condition, and solving the fifth optimization condition set in a second alternating optimization process, wherein the second alternating optimization process comprises a plurality of second iteration processes, which comprise following steps:

when a third weight value of the third beamforming weight optimization value is given, transforming the fourth constraint condition into a fifth constraint condition;

constructing a sixth optimization condition set based on the fifth constraint condition and the fourth restrictive condition;

solving the sixth optimization condition set to obtain the fourth weight value of a next one of the second iteration processes;

obtaining the third weight value of the next one of the second iteration processes based on the fourth weight value; and repeating the above steps until all the second iteration processes are executed; and obtaining the third beamforming weight optimization value according to the third weight value of each of the second iteration processes, and obtaining the fourth beamforming weight optimization value according to the fourth weight value of each of the second iteration processes.

7. An integrated communication, sensing and computation system, comprising a transmitting beamformer and a receiving beamformer, wherein a first beamforming weight optimization value for the receiving beamformer and a second beamforming weight optimization value for the transmitting beamformer are calculated according to the waveform design method of claim 1.

8. An electronic device, comprising a memory and a processor, wherein the memory stores a computer program which, when executed by the processor, implements the waveform design method of claim 1.

9. A non-transitory computer-readable storage medium, storing a computer program, wherein the computer program, when executed by a processor, causes the processor to implement the waveform design method of claim 1.

10. A waveform design device, applied to an integrated communication, sensing and computation system, wherein the integrated communication, sensing and computation system comprises a transmitting beamformer, a receiving beamformer, and at least one sensing device, wherein a transmitted signal to each of the sensing devices is a transmitted signal obtained by performing beamforming on an initial transmitted signal of each of the sensing devices by the transmitting beamformer, the initial transmitted signal is radar sensing pulse, and the waveform design device comprises:

a first constraint condition construction module, configured to acquire a received vector aggregated by the receiving beamformer, calculate a result standard deviation between the received vector and a true data value, and minimize the result standard deviation to construct a first constraint condition;

a first restrictive condition construction module, configured to calculate a covariance matrix of the transmitted signal to each of the sensing devices according to the transmitting beamformer, and obtain a first restrictive condition and a second restrictive condition based on the covariance matrix and total transmission power;

a first mode solving module, configured to, if the integrated communication, sensing and computation system operates in a first mode, construct a first optimization condition set according to the first constraint condition and the first restrictive condition, and solve the first optimization condition set in a first alternating optimization process to obtain a first beamforming weight optimization value for the receiving beamformer and a second beamforming weight optimization value for the transmitting beamformer;

a second mode solving module, configured to, if the integrated communication, sensing and computation system operates in a second mode, construct a second optimization condition set according to the first constraint condition and the second restrictive condition, and solve the second optimization condition set to obtain a third beamforming weight optimization value for the receiving beamformer and a fourth beamforming weight optimization value for the transmitting beamformer; and a waveform design module, configured to generate a transmitted waveform for the transmitted signal by using the second beamforming weight optimization value for the transmitting beamformer in the first mode, or generate a transmitted waveform for the transmitted signal by using the fourth beamforming weight optimization value for the transmitting beamformer in the second mode.

* * * * *